United States Patent [19]

Quesnelle et al.

[11] Patent Number: 5,235,799
[45] Date of Patent: Aug. 17, 1993

[54] RAKE WITH WHEELS AND SWINGING COMB

[76] Inventors: Stella M. Quesnelle; Albert A. Quesnelle, both of P.O. Box 270, Concession 13, Tiny Township, Penetanguishene, Ontario, Canada, L0K 1P0

[21] Appl. No.: 853,264

[22] Filed: Mar. 18, 1992

[30] Foreign Application Priority Data

May 9, 1991 [GB] United Kingdom ................. 9110051

[51] Int. Cl.⁵ .............................................. A01D 7/00
[52] U.S. Cl. ............................... 56/400.04; 56/400.14
[58] Field of Search ........... 56/400.14, 400.02, 400.04, 56/400.09, 400.13, 400.2, 400.21

[56] References Cited

U.S. PATENT DOCUMENTS

| | | | |
|---|---|---|---|
| 2,953,210 | 9/1960 | Bauserman | 56/400.09 |
| 3,374,614 | 3/1968 | Dacheux, Jr. | 56/400.14 |
| 4,704,852 | 11/1987 | Knapp | 56/400.14 |

Primary Examiner—Terry Lee Melius
Attorney, Agent, or Firm—R. Craig Armstrong

[57] ABSTRACT

A rake is described, having wheels mounted rotatably thereto which enable the rake to be moved easily from place to place without lifting the rake from the ground. When the rake is pulled towards the user, the comb is locked such that its teeth are in the conventional operative position, i.e. pointing downwardly, but when the rake is pushed away, the comb rotates out of the way to permit the rake to be pushed easily, even over piles of debris just raked.

7 Claims, 4 Drawing Sheets

RAKE WITH WHEELS AND SWINGING COMB

BACKGROUND OF THE INVENTION

This invention relates to rakes.

With a conventional rake, the user must lift the rake after each stroke to move it to the next location. Also, the teeth of the rake tend to dig into the ground, which limits the effectiveness of the rake. For elderly people in particular, but for anyone in general, these factors make raking an unnecessarily difficult and tedious process. Also, because of the tendency for the teeth to dig into the ground, it is difficult to rake a surface evenly.

SUMMARY OF THE INVENTION

It is an object of the invention to provide a rake having wheels mounted rotatably thereto which enable the rake to be moved easily from place to place without lifting the rake from the ground. When the rake is pulled towards the user, the comb is locked such that its teeth are in the conventional operative position, i.e. pointing downwardly, but when the rake is pushed away, the comb rotates out of the way to permit the rake to be pushed easily, even over piles of debris just raked.

Further features of the invention will be described or will become apparent in the course of the following detailed description.

BRIEF DESCRIPTION OF THE DRAWINGS

In order that the invention may be more clearly understood, the preferred embodiment thereof will now be described in detail by way of example, with reference to the accompanying drawings and photograph copies, in which.

DETAILED DESCRIPTION OF THE PREFERRED EMBODIMENT

Figure 1:
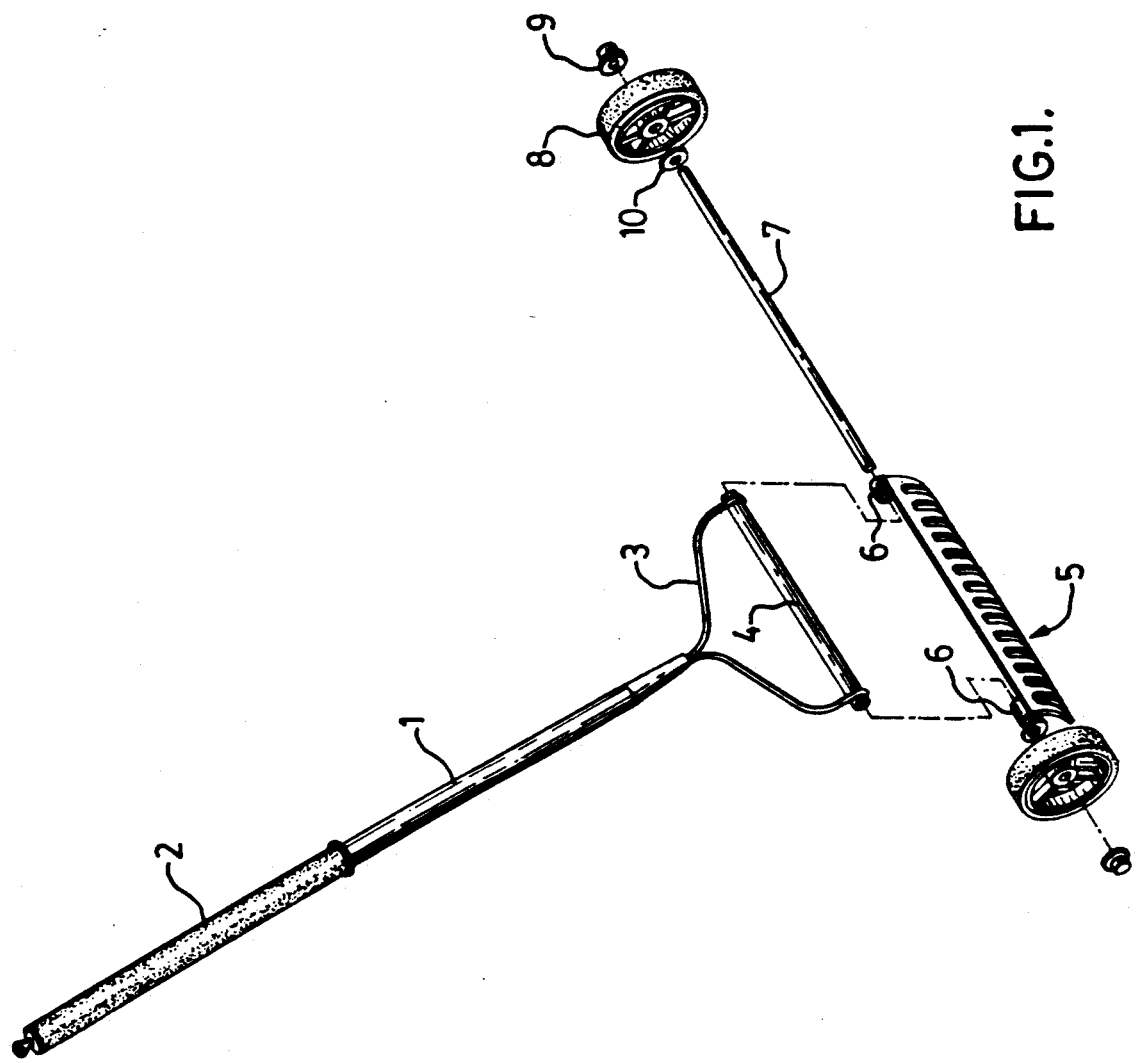
FIG. 1 is an exploded perspective view of the preferred embodiment.
Figure 2:
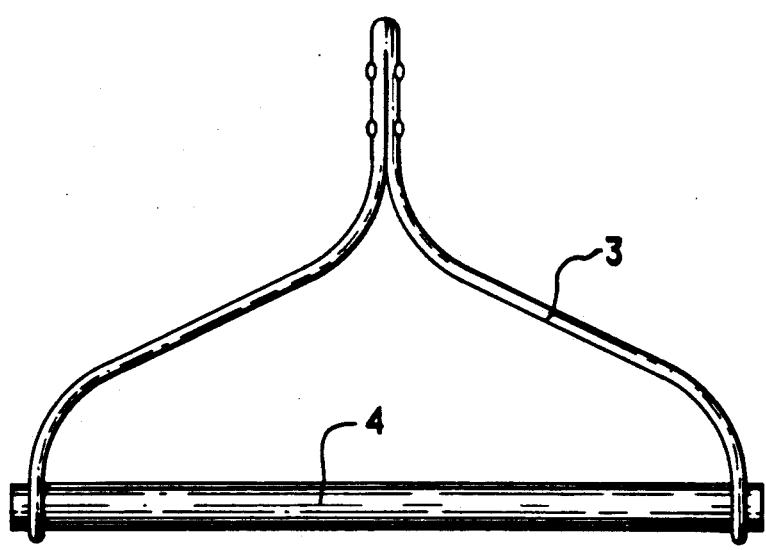
FIG. 2 is a front elevation view of the bow of the preferred embodiment.
Figure 3:
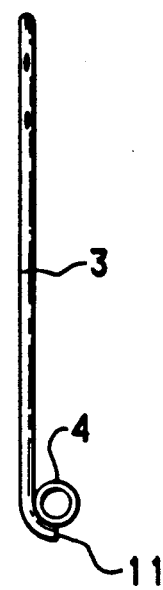
FIG. 3 is side elevation view of the bow of the preferred embodiment.
Figure 4:
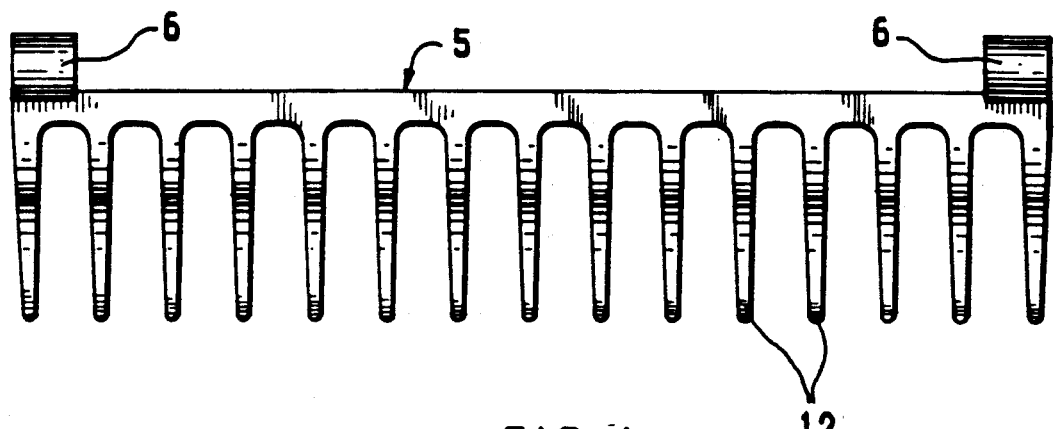
FIG. 4 is a front elevation view of the comb.
Figure 5:
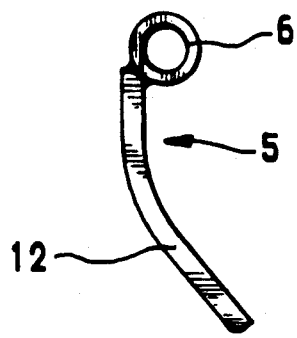
FIG. 5 is a side elevation view of the comb.

In the preferred embodiment, the rake handle 1, which preferably has a sponge grip 2, has a generally Y-shaped bow portion 3 secured thereto, projecting from the lower end of the handle. A cylindrical sleeve 4 is welded or otherwise permanently affixed across the lower ends of the two arms of the bow.

The comb portion 5 of the rake has two cylindrical pieces 6 at each upper end, which align with the cylindrical sleeve 4 at either end thereof. An axle 7 is positioned through the cylindrical pieces 6 and sleeve 4, and wheels 8 are secured on either end of the axle, via retaining caps 9. Washers 10 are positioned between the cylindrical pieces 6 and the wheels.

Figure 6:
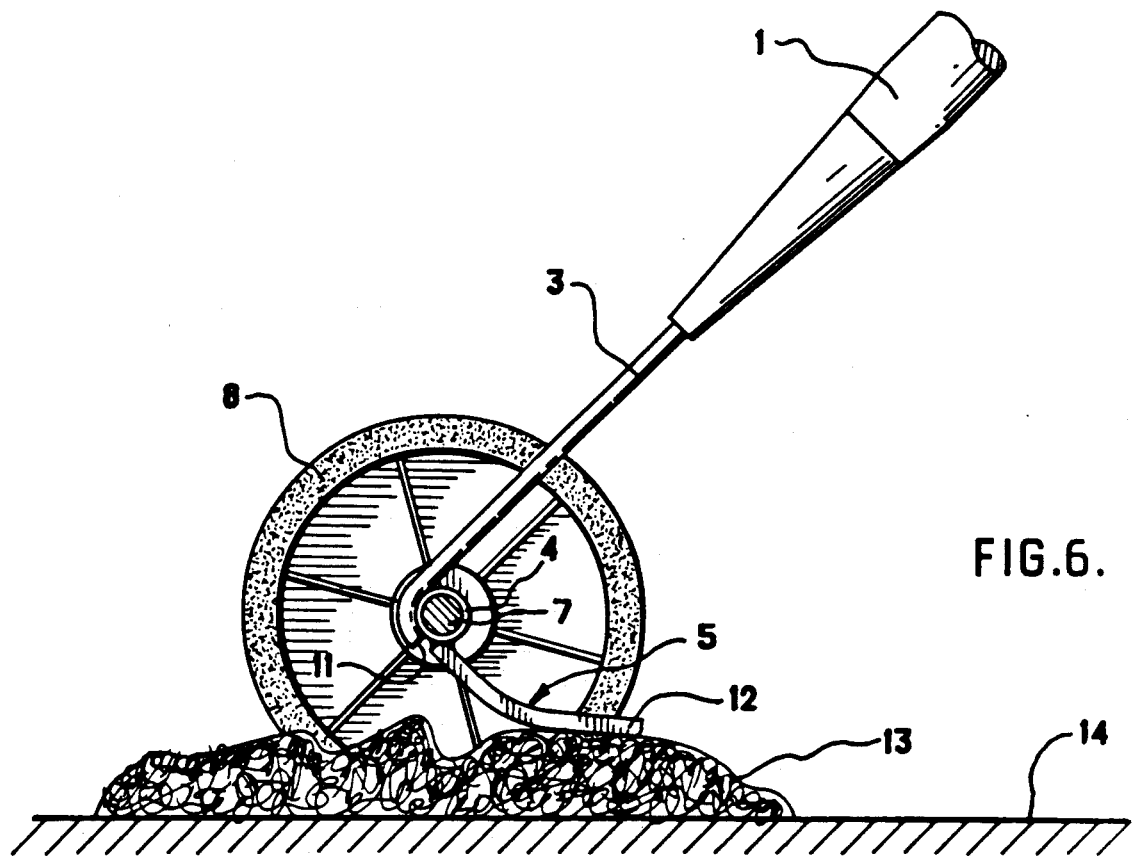
FIG. 6 is a side elevation view showing the comb rotated out of the operative position, i.e. where the user is pushing the rake.
Figure 7:
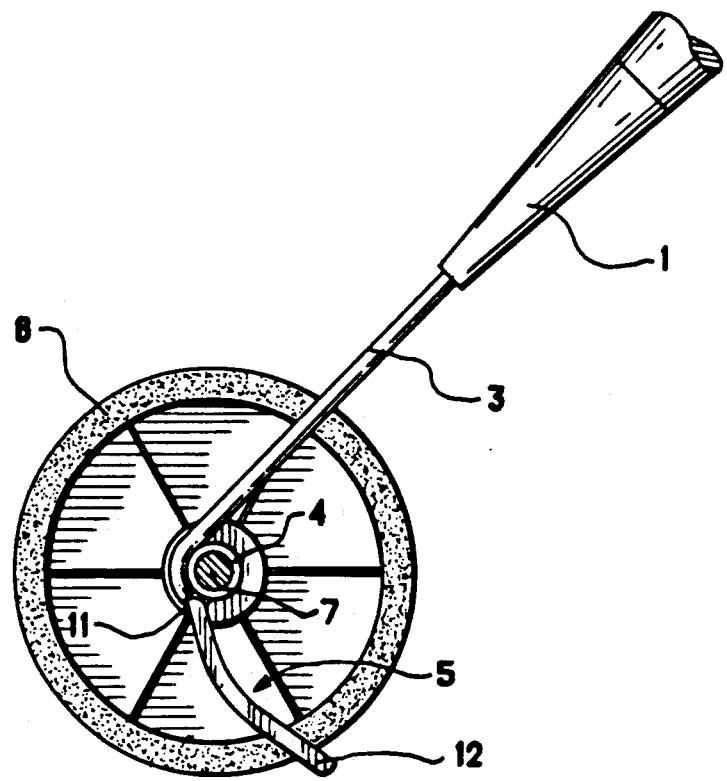
FIG. 7 is a side elevation view showing the comb in its operative position, i.e. with teeth pointing down, where the user is pulling the rake.

The comb is thus generally free to rotate on the axle. Thus, as shown in FIG. 6, the rake is easily pushed forwardly over debris 13 just raked. However, when the rake is pulled towards the user, the ends 11 of the arms of the bow come into contact with the comb, acting as stops to prevent further rotation, thus in effect locking the comb in the operative position. This is seen best in FIG. 7. In the preferred embodiment, the stops are arranged to prevent rotation beyond approximately 90 degrees from the handle. It will be appreciated that the angle is not critical. An angle of approximately 135 degrees could be used, for example, equating to teeth pointing straight down and the handle angling upwardly at 45 degrees. The angle of about 90 degrees has been found through experimentation to be the optimum angle, although personal preference may have a bearing, as may the exact nature of the raking work to be done.

Whatever the angle of the teeth, the wheels keep the teeth 12 from digging into the ground 14, by maintaining the appropriate spacing. The size of the wheels, or the length of the teeth, must of course be matched generally so that the teeth extend far enough, but not too far, into the ground. The extent to which the teeth dig into the ground may be controlled by the user, by varying the angle of the handle.

Figure 8:
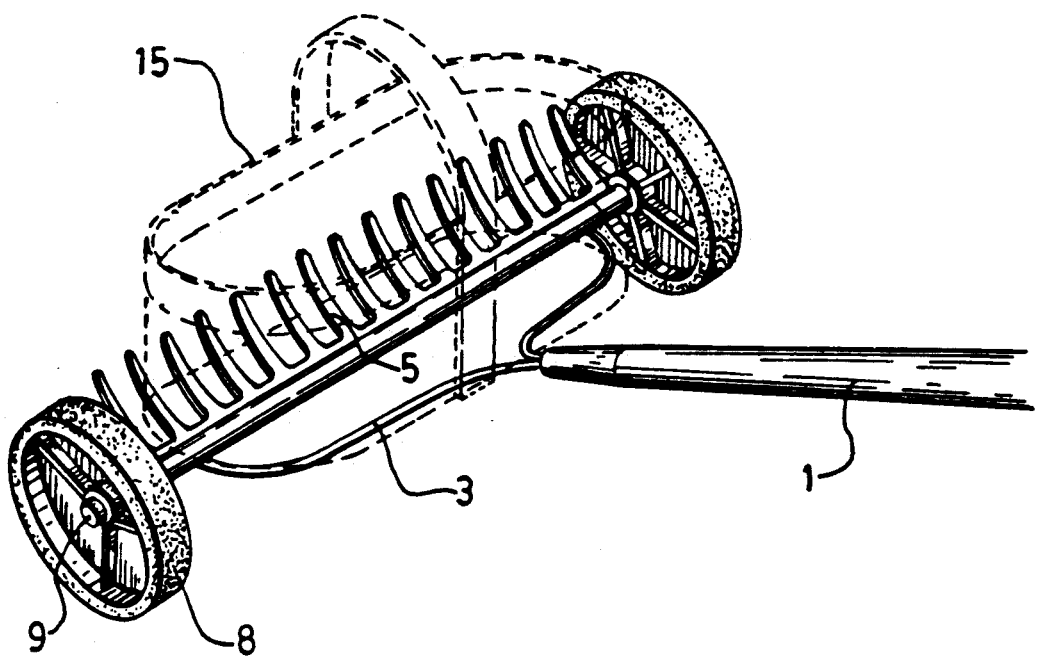
FIG. 8 is a perspective view showing the rake with the handle flipped over to the other side, to form a carrying platform.
Figure 9:
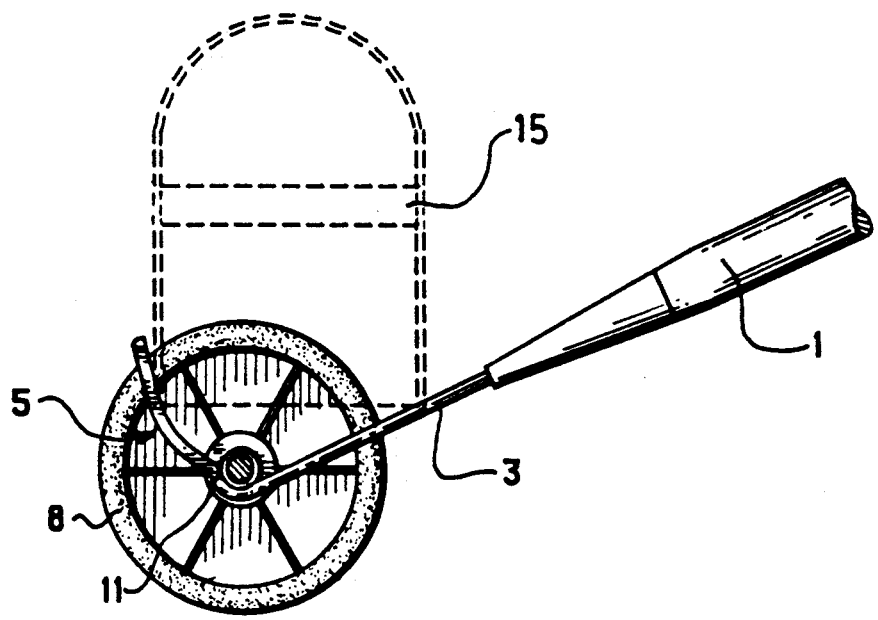
FIG. 9 is a side elevation view corresponding to FIG. 8.

As seen in FIGS. 8 and 9, the handle may be swung over to the opposite side from the usual operational side. The comb then forms a platform on which small items may be carried, such as an empty fruit basket 15 to carry small hand tools or raked debris, or on which a larger item such as a garbage bag could be balanced.

The features of the invention make it extremely easy to use. No lifting is required. The rake merely needs to be pushed over any debris, and then pulled back towards the user. Because the teeth do not dig into the ground, more effective raking can be achieved. Levelling loose earth is particularly facilitated. The teeth also tend to be self-cleaning, since pushing the rake forward tends to push debris off the teeth.

It will be appreciated that the above description relates to the preferred embodiment by way of example only. Many variations on the invention will be obvious to those knowledgeable in the field, and such obvious variations are within the scope of the invention as described and claimed, whether or not expressly described.

For example, rotation of the comb could be provided for in a number of other ways. A rigid axle could be used, for example, with bearing-mounted wheels on either end thereof, instead of a rotating axle as described above. The comb would rotate about the rigid axle.

What is claimed as the invention is:

1. A rake for use on the ground comprising:
   a elongated handle having an upper end and a lower end;
   an axle mounted at the lower end of the handle, at a right angle thereto;
   a comb rotatably mounted on said axle, and having raking teeth projecting downwardly therefrom;
   wheels mounted on each end of said axle; and
   stop means mounted to prevent rotation of said comb beyond about 135 degrees from said handle wherein the handle is pivotable between an in use position where the comb is in contact with the ground and a carrying position where the comb is spaced above the ground.

2. A rake as recited in claim 1, in which said axle is rotatable, being carried by a cylindrical sleeve rigidly mounted at the lower end of the handle at a right angle thereto, said wheels being rigidly mounted to the ends of said axle 3. A rake as recited in claim 2, in which said cylindrical sleeve is secured to the lower end of the handle by virtue of said handle having a bow at the lower end thereof, comprising two arms extending downwardly and outwardly therefrom, said sleeve being secured between said arms.

4. A rake as recited in claim 1, in which said stop means are mounted to prevent rotation of said comb beyond about 90 degrees from said handle.

5. A rake as recited in claim 2, in which said stop means are mounted to prevent rotation of said comb beyond about 90 degrees from said handle.

6. A rake as recited in claim 3, in which said stop means are mounted to prevent rotation of said comb beyond about 90 degrees from said handle.

7. A rake for use on the ground comprising:
a elongated handle having an upper end and a lower end;
a bow/sleeve assembly secured to the lower end of the handle, comprising a bow having two arms extending downwardly and outwardly therefrom, and a cylindrical sleeve secured across the ends of said arms;
a comb having cylindrical pieces secured to the upper edge therefrom, said cylindrical pieces being adapted to align with opposite ends of said cylindrical sleeve;
an axle passing through said cylindrical pieces and said sleeve, and having wheels secured on opposite ends thereof, whereby said comb is rotatable with respect to said handle and bow; and
said bow/sleeve assembly having at least one projection therefrom to prevent rotation of said comb therepast wherein the handle is pivotable between an in use position where the comb is in contact with the ground and a carrying position where the comb is spaced above the ground.

* * * * *